(12) United States Patent
Mori et al.

(10) Patent No.: US 10,775,548 B2
(45) Date of Patent: Sep. 15, 2020

(54) LIGHT GUIDE PLATE, SURFACE LIGHT EMITTING APPARATUS, AND METHOD FOR MANUFACTURING LIGHT GUIDE PLATE

(71) Applicant: Central Glass Company, Limited, Ube-shi, Yamaguchi (JP)

(72) Inventors: Naoya Mori, Tsu (JP); Kensuke Izutani, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 16/344,602

(22) PCT Filed: Nov. 20, 2017

(86) PCT No.: PCT/JP2017/041623
§ 371 (c)(1),
(2) Date: Apr. 24, 2019

(87) PCT Pub. No.: WO2018/105365
PCT Pub. Date: Jun. 14, 2018

(65) Prior Publication Data
US 2020/0057189 A1 Feb. 20, 2020

(30) Foreign Application Priority Data
Dec. 7, 2016 (JP) .................. 2016-237706

(51) Int. Cl.
*F21V 8/00* (2006.01)
*B32B 17/10* (2006.01)

(52) U.S. Cl.
CPC ...... *G02B 6/0043* (2013.01); *B32B 17/10036* (2013.01); *G02B 6/0073* (2013.01); *G02B 6/0093* (2013.01)

(58) Field of Classification Search
CPC .. G02F 1/133524; G02B 6/0033–0043; G02B 6/0065
See application file for complete search history.

(56) References Cited

U.S. PATENT DOCUMENTS 6,261,398 B1 * 7/2001 Costa ................. B32B 17/10
156/102
6,559,909 B1 * 5/2003 Kushida ............ G02F 1/13362
349/62

(Continued)

FOREIGN PATENT DOCUMENTS

CN 105522730 A 4/2016
EP 0 842 767 A1 5/1998

(Continued)

OTHER PUBLICATIONS

International Search Report (PCT/ISA/210) issued in PCT Application No. PCT/JP2017/041623 dated Feb. 20, 2018 with English translation (five (5) pages).

(Continued)

*Primary Examiner* — Mariceli Santiago
(74) *Attorney, Agent, or Firm* — Crowell & Moring LLP

(57) ABSTRACT

A light guide plate according to one embodiment of the present invention includes two glass sheets and a scattering layer sandwiched between and integrated with the glass sheets, wherein the scattering layer is a transparent resin film formed by stretching, and wherein the light guide plate has a haze of 0.2% or higher as determined according to JIS K 7136. The light guide plate is suitable for use in an edge-light-type surface light emitting apparatus. It is preferable that the scattering layer is a biaxially stretched transparent polyethylene terephthalate film. It is also preferable that the light guide plate further includes an adhesive resin layer between the scattering layer and the glass sheet.

12 Claims, 4 Drawing Sheets

(56) References Cited

U.S. PATENT DOCUMENTS

| | | |
|---|---|---|
| 2002/0012085 A1 | 1/2002 | Honda et al. |
| 2011/0110117 A1 | 5/2011 | Takai et al. |
| 2013/0114292 A1 | 5/2013 | Brick et al. |
| 2015/0253486 A1 | 9/2015 | Verger et al. |
| 2016/0011360 A1 | 1/2016 | Hasegawa et al. |
| 2016/0097895 A1 | 4/2016 | Wolk et al. |

FOREIGN PATENT DOCUMENTS

| | | |
|---|---|---|
| JP | 2002131535 A * | 5/2002 |
| JP | 2007-80531 A | 3/2007 |
| JP | 2010-36487 A | 2/2010 |
| JP | 2010-202442 A | 9/2010 |
| JP | 2012-163715 A | 8/2012 |
| JP | 2014-164989 A | 9/2014 |
| WO | WO 2005/083474 A1 | 9/2005 |
| WO | WO 2012/059126 A1 | 5/2012 |

OTHER PUBLICATIONS

Japanese-language Written Opinion (PCT/ISA/237) issued in PCT Application No. PCT/JP2017/041623 dated Feb. 20, 2018 (three (3) pages).
"Plastics—Determination of Haze for Transparent Materials", Japanese Industrial Standard, Feb. 20, 2000, Japanese Standards Association, Reference No. JIS K 7136:2000, English Translation: ISO 14782:1999 (25 pages).
Extended European Search Report issued in counterpart European Application No. 17877687.8 dated Aug. 21, 2019 (eight (8) pages).
European Office Action issued in European Application No. 17 877 687.8 dated Jun. 10, 2020 (five pages).
Cover page of EP 2 635 433 A1, published Sep. 11, 2013 (one page).

* cited by examiner

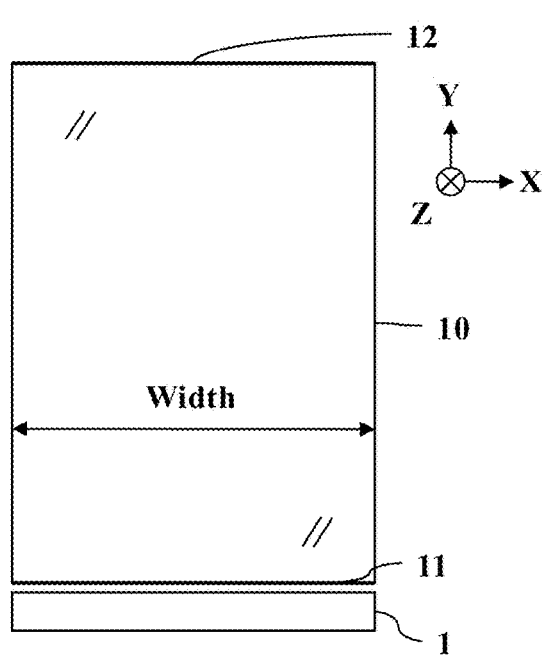
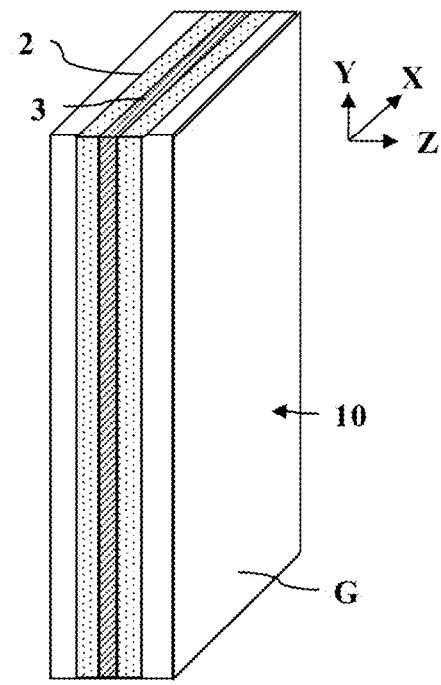
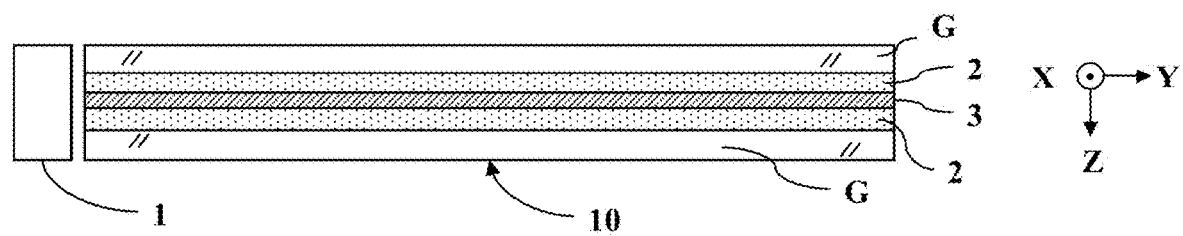

LIGHT GUIDE PLATE, SURFACE LIGHT EMITTING APPARATUS, AND METHOD FOR MANUFACTURING LIGHT GUIDE PLATE

FIELD OF THE INVENTION

The present invention relates to a light guide plate for use in a surface light emitting apparatus.

BACKGROUND ART

Surface light emitting apparatuses are conventionally used as illumination signs, displays, lighting fixtures for vehicles or buildings, and the like. There are surface light emitting apparatuses: one of which is of the backlight type where light from a light source is incident perpendicular to a light emitting surface; and the other of which is the edge-light type where light from a light source is incident substantially parallel to a light emitting surface. In recent years, edge-light type surface light emitting apparatuses have been widely adopted from the viewpoint of reductions in apparatus thickness and weight (see, for example, Patent Document 1).

There is widely known a light emitting apparatus of the above-mentioned edge-light type, including: an LED as a light source; and a light guide plate having a light guide part that guides incident light to propagate in a planar direction and a scattering part that scatters incident light toward the outside. Conventionally, a plate of transparent resin such as acrylic resin, polycarbonate or polystyrene or a plate of glass is used as the light guide part; and an ink or coating with a scattering function or the like is used as the scattering part.

It has been conventionally common to provide a single plate of resin or glass as a light guide part as mentioned above and print an ink or coating on a surface of the single plate or perform laser processing on a surface of the single plate for improvement of the scattering properties of the surface. There is however a problem that the resin plate is low in chemical resistance, weather resistance, scratch resistance and the like.

In order to solve the above problem, Patent Document 2 discloses a light guide plate in which a resin sheet having a coating of light scattering paint or ink on a surface thereof is sandwiched between and integrated with glass sheets via adhesive layers. In this patent document, the glass and resin sheets are used as a light guide part; and the light scattering paint or ink is used as a scattering part. Further, transparent resins such as acrylic resin, polycarbonate, polyethylene terephthalate (PET), polypropylene (PP), cycloolefin polymer (COP), urethane and the like are disclosed as material examples of the resin sheet used as the light guide part.

Patent Document 3 discloses a surface-emission laminated glass in which a reflection film, a light guide plate and a diffusion film are sandwiched in this order between two glass sheets and integrated together. In this patent document, the light guide plate is used as a light guide part; and the diffusion film is used as a scattering part. The light guide plate is provided to allow light to propagate therethrough by total reflection at both surfaces thereof. Plates of highly transparent resins such as acrylic resin are disclosed as examples of the light guide plate. The diffusion film is provided as a film having a light diffusion layer formed using a binder resin and a light diffusing agent or a film having a surface subjected to blast treatment. There are disclosed PET films as examples of the diffusion film.

PRIOR ART DOCUMENTS

Patent Documents

Patent Document 1: Japanese Laid-Open Patent Publication No. 2007-080531
Patent Document 2: Japanese Laid-Open Patent Publication No. 2014-164989
Patent Document 3: Japanese Laid-Open Patent Publication No. 2010-202442

SUMMARY OF THE INVENTION

As mentioned above, the conventional resinous light guide plate is low in chemical resistance, weather resistance, scratch resistance and the like and thus is not suitable for outdoor use or use under exposure to direct sunlight.

It is accordingly an object of the present invention to provide a light guide plate using glass and applicable for use in an edge-light-type surface light emitting apparatus.

Means for Solving the Problems

It has been believed according to the common knowledge of those skilled in the art that polyethylene terephthalate (hereinafter also referred to as "PET"), which shows excessively high internal scattering properties, causes light scattering only at a location near a light source and thus does not perform surface light emission.

As mentioned above, Patent Document 2 discloses using PET as the transparent material of the light guide plate arranged between the glass sheets. Further, Patent Document 3 discloses using, as the light diffusion film, the PET film subjected to light diffusion treatment.

The present inventors have surprisingly found that a laminated glass, produced by laminating a PET film between two glass sheets via PVB films, degassing the laminate and then integrating the laminate as one piece under pressurized and heated conditions, performs surface light emission upon the entry of incident light from an LED light source into an end surface of the laminated glass. The present inventors have found as a result of further researches that the laminated glass in which the PET film is sandwiched between and integrated with the glass sheets performs surface light emission without a light scattering paint or ink being applied to or contained in the PET film. In other words, it has been newly found that, in the above laminated glass, the PET film functions as a scattering part.

As a result of measurements made on the optical properties of the laminated glass, it has been found that the laminated glass having a haze of 0.2% or higher can be used as a light guide plate. It has also been found that haze value of the film is higher before being integrated into the laminated glass than after being integrated into the laminated glass. The mechanism of surface light emission of the laminated glass is not clear, but is assumed as follows based on the obtained findings. The PET film used is a stretched transparent film. The stretched film is generally known to have a structure in which polymers in the film are oriented by stretching process. The film with a polymer orientation brings about polarization whereby light can be scattered by the polarization characteristics of the film. Further, the surface haze of the film is lowered by degassing and integrating the laminate whereby the film can suppress excessive light scattering. Consequently, the film goes beyond light scattering at a location near the light source and enables surface light emission.

Namely, there is provided according to a first aspect of the present invention a light guide plate comprising: two glass sheets; and a scattering layer sandwiched between and integrated with the glass sheets, wherein the scattering layer is a stretched transparent resin film, and wherein the light guide plate has a haze of 0.2% or higher as determined according to JIS K 7136.

There is provided according to a second aspect of the present invention a method for manufacturing a light guide plate, comprising: laminating a first glass sheet, a stretched transparent resin film and a second glass sheet in order of mention, thereby obtaining a laminate; degassing the laminate; and, after the degassing, integrating the laminate as one piece.

It is possible according to the present invention to provide the light guide plate using glass and applicable for use in an edge-light-type surface light emitting apparatus.

BRIEF DESCRIPTION OF THE DRAWINGS

FIGS. 1A and 1B are schematic views showing the definitions of upper and lower sides, width and thickness direction of a light guide plate in the present specification.

FIG. 2 is a schematic cross-sectional view showing one embodiment of the present invention.

DETAILED DESCRIPTION OF THE EMBODIMENTS

1. Explanation of Terms

Figure 3A:
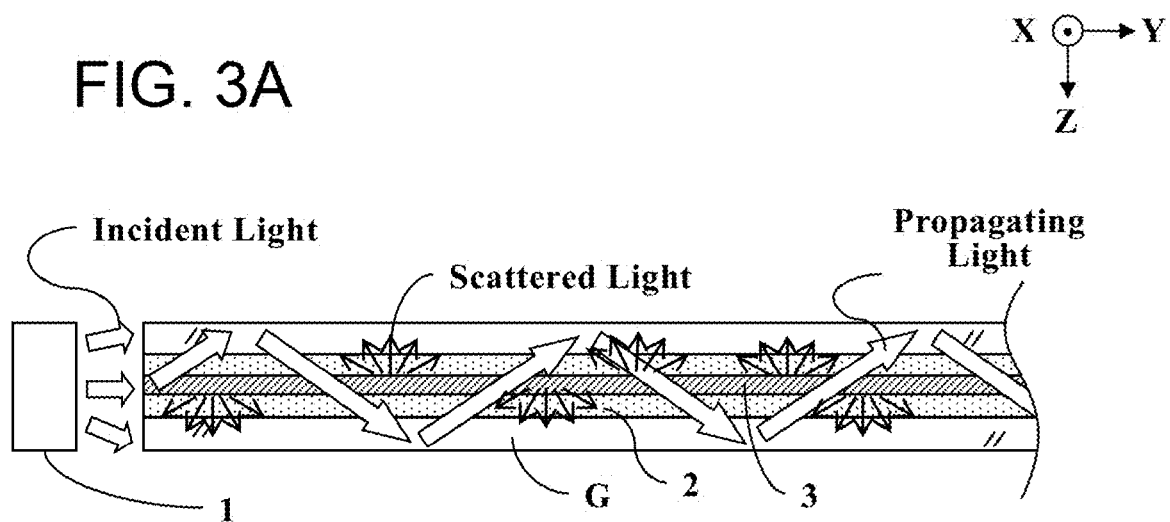
FIG. 3A is a schematic cross-sectional view showing surface light emission according to one embodiment of the present invention.

In the present specification, the following terms are defined as follows. As shown in FIG. 1, sides of a light guide plate 10 closer to and farther away from a light source 1 are respectively referred to as lower and upper sides 11 and 12. A direction from the lower side 11 to the upper side 12 is referred to as a Y direction; a direction parallel to the lower and upper sides 11 and 12 is referred to as an X direction; and a thickness direction of glass sheets adhesive resin layers 2 and a scattering layer 3 is referred to as a Z direction. A length of the glass sheets G of the light guide plate 10 in the X direction is referred to as a width of the light guide plate 10. X-Y and Y-Z surfaces of the light guide plate are referred to as end surfaces of the light guide plate.

(Haze)

In the present specification, the term "haze" refers to a haze value measured according to JIS K 7136 with the use of a haze meter (manufactured as "HX-T" by Suga Test Instruments Co., Ltd.). In the haze value measurement, glass sheets used are e.g. soda-lime sheet glass with a thickness of 2 mm.

(Luminance)

The term "luminance" refers to a luminance value (in units of $cd/m^2$) of surface light emission measured, at a position of 20 mm from the lower side of a light guide plate in the vicinity of a width center of the light guide plate, with the use of a two-dimensional luminance colorimeter (manufactured as "UA-200A" by Topcon Technohouse Corporation) in the present specification.

(Transparency)

In the present invention, a stretched transparent resin film is used as the scattering layer as will be explained below. The term "transparent" means that the film has a total light transmittance of 80% or higher before being integrated into a light guide plate. The total light transmittance can be measured with the use of the above-mentioned haze meter.

2. Light Guide Plate

Hereinafter, preferred embodiments of the first aspect of the present invention and application examples thereof will be described below with reference to FIGS. 2, 3 and 5. It should however be understood that the present invention is not limited to the following embodiments.

A light guide plate 10 according to one preferred embodiment of the first aspect of the present invention includes two glass sheets G and a scattering layer 3 sandwiched between and integrated with the glass sheets G via adhesive resin layers 2, wherein the scattering layer 3 is a transparent resin film formed by stretching, and wherein the light guide plate 10 has a haze of 0.2% or higher as determined according to JIS K 7136.

(Glass Sheet G)

The kind of the glass sheets G used is not particularly limited. Commercially available sheet glasses are usable as the glass sheets G The glass sheets G can be of ordinary glass such as float glass or processed glass such as tempered glass or curved glass. Preferably, the glass sheets G have a composition of highly transparent glass such as soda-lime glass or high-transmittance glass. The glass sheets G may alternatively have a composition of colored glass as long as those colored glass sheets do not excessively absorb visible light.

The thickness of the glass sheets G used is not also particularly limited. For example, the thickness of the glass sheets G can be set within the range (of e.g. 1 to 25 mm) suitable for use in ordinary vehicle or building applications. For use in vehicle applications, the thickness of the glass sheets G is preferably of the order of 1 to 5 mm in view of the recent need for vehicle body weight reduction. There may alternatively be used thin glass sheets with a thickness of e.g. smaller than 1 mm.

Various coating films such as infrared absorption films, infrared reflection films, ultraviolet absorption films, ultraviolet reflection films, coloring films, visible reflection films, anti-reflection films or the like may be applied to surfaces of the glass sheets G as long as light emission of the light guide plate 10 is not interfered with by such coating films.

(Adhesive Resin Layer 2)

There is no particular limitation on the adhesive resin layers 2 as long as the adhesive resin layers 2 are formed of a resin material that has a refractive index difference of less than 0.1 relative to the glass sheets are capable of integrating the glass sheets G and the scattering layer 3 with each other and are not colored under heating. Preferably, the resin material contains at least one selected from the group consisting of a polyvinyl butyral (hereinafter also referred to as "PVB") resin, an ethylene-vinyl acetate copolymer (hereinafter also referred to as "EVA") resin, a cycloolefin polymer resin, a polyurethane resin, an acrylic resin, an ionomer resin and a thermoplastic elastomer. In view of the fact that the use of a thermoplastic resin in film form at room temperatures leads to good workability, PVB and EVA resins are particularly preferable as the resin material. The adhesive resin layers 2 may not be used as long as the transparent resin film and the glass sheets G are integrable with each other.

The adhesive resin layers 2 may each have a sound insulating function, a heat shielding function or heat insulating function, high elasticity etc. as required. For example, the adhesive resin layer 2 can be each in the form of a high-sound-insulating PVB resin layer, a PVB resin layer containing an infrared absorbing agent, a high-elastic PVB resin layer, a low-elastic PVB resin layer, a wedge-shaped PVB resin layer with a thickness gradient. The adhesive resin layer 2 may have a laminated structure of two or more kinds of resins.

(Scattering Layer 3)

As mentioned above, the transparent resin film formed by stretching is used as the scattering layer 3. Herein, the term "stretching" refers to the process of stretching the film in a uniaxial or biaxial direction under heating at a predetermined temperature for the purpose of mainly adjusting the thickness of the film. It is considered that, as there is developed a polymer orientation in the transparent resin film by the stretching process, the transparent resin film becomes capable of scattering light. Examples of the stretched transparent resin film are those of PET, PEN, polybutylene terephthalate, nylon, polypropylene, polystyrene and the like. Particles with a sound insulating function or an infrared/ultraviolet absorption or reflection function may be contained in the transparent resin film, or a coating film with the above-mentioned function may be applied to a surface of the transparent resin film, as long as light emission of the light guide plate is not interfered with by such particles or coating film.

Preferably, the scattering layer 3 is a transparent polyethylene terephthalate film formed by biaxial stretching. It is considered that the biaxially stretched resin film is higher in orientation and thus is more likely to scatter light. Further, two kinds of PET films are commercially available: one is a non-transparent PET film whose crystallization degree is set high to obtain a scattering function; and the other is a transparent PET film whose crystallization degree is set low to maintain transparency. For surface light emission, incident light needs to be not only scattered by the film but also propagate through the film. It is thus preferable to use the latter transparent PET film.

Further, the transparent resin film is preferably higher in refractive index than the glass sheets G and the adhesive resin layers 2 for improvement of surface light emission. It is particularly considered that, in the case where the refractive index difference between the glass sheet G and the adhesive resin layer 2 is less than 0.1, the larger the refractive index difference between the transparent resin film and the adhesive resin layer 2, the more likely the transparent resin film is to cause refraction or reflection of light.

The thickness of the transparent resin film is not particularly limited. In terms of good workability, the thickness of the transparent resin film is preferably of the order of 30 to 300 µm. It is considered that, as the thickness of the transparent resin film becomes larger, the effect of the scattering layer 3 increases for improvement of surface light emission. There would thus be no problem, even if the thickness of the transparent resin film exceeds 300 µm, as long as the transparent resin film is integrable with the glass sheets.

In the present invention, a light scattering paint or ink may intentionally not be contained in the scattering layer 3 or not be applied to a surface of the scattering layer 3. It is considered that, as the scattering layer 3 causes light scattering due to the polymer orientation of the transparent resin film, the light guide plate is able to perform surface light emission even without intentionally adding a light scattering component to the scattering layer.

The transparent resin film is of the kind having a haze of 0.2% or higher after being integrated into the light guide plate 10. As a result of researches made by the present inventors, it has been found that the haze value of the light guide plate 10 tends to be lower than the haze value of the transparent resin film by itself. The reason for this is assumed to be that: before the transparent resin film is integrated into the light guide plate 10, the sum of a surface haze and an internal haze of the transparent resin film is measured as the haze value of the transparent resin film; and, after the transparent resin film is integrated into the light guide plate 10, the surface haze of the transparent resin film is lowered by adhesion of the adhesive resin layer 2 to the surface of the transparent resin film so that the internal haze of the transparent resin film is mainly measured as the haze value of the transparent resin film. It is consequently preferable to use the transparent resin film having a high internal haze.

Herein, it is difficult to measure only the internal haze of the transparent resin film in advance. It is hence difficult to judge which transparent resin film is suitable unless the transparent resin film is actually integrated. As a result of researches made on the light guide plate 10 with good surface light emission performance, it has been found that the transparent resin film whose haze increases with thickness tends to show a high haze value even after being integrated into the light guide plate 10. The haze value of the light guide plate 10 can be thus set to 0.2% or higher by increasing the thickness of the transparent resin film even when the transparent resin film has a low correlation between the surface and internal hazes.

The surface area of the transparent resin film may be equal to or smaller than the surface area of the glass sheets G opposed to the transparent resin film. In the case where each of the glass sheets G is formed with a curved surface, the transparent resin film is integrated with the glass sheets G by being deformed to follow the curved surface shape of the glass sheets G so that there arises the problem of a wrinkle occurring in a peripheral portion of the transparent resin film overlapping peripheral portions of the glass sheet G In this case, it is preferable to set the surface area of the transparent resin film smaller than the surface area of the glass sheets G such that the peripheral portion of the transparent resin film does not overlap the peripheral portions of the glass sheets G for prevention of the above-mentioned wrinkle. It is feasible to use the transparent resin sheet by dividing the film into a plurality of sheets, or cutting out any portion of the film other than the peripheral portion, as required.

The transparent resin film may have a laminated film of two or more transparent resin film layers. In this case, the transparent resin film layers are preferably integrated into one by any adhesive, physical adsorption or the like. Any other functional transparent film layer may be laminated between the transparent resin film layers via adhesives etc. Examples of the functional transparent film layer are those having a light modulating function, a liquid crystal function, a heat shielding function and the like. The functional transparent film layer is not necessarily laminated between the transparent resin film layers, and may be laminated on one transparent resin film layer. The transparent resin film may alternatively be laminated between two or more functional transparent film layers.

(Binder Layer 4)

Figure 5:
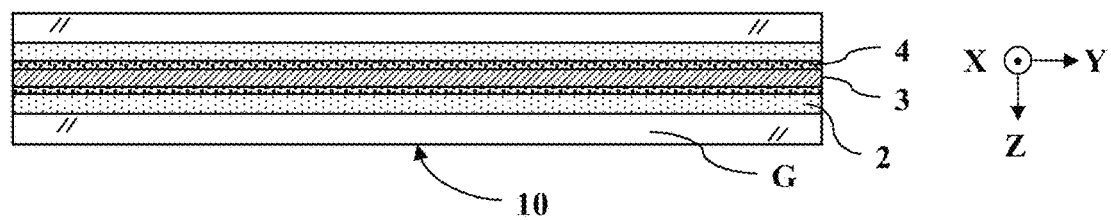
FIG. 5 is a schematic cross-sectional view showing another embodiment of the present invention.

In the case where the light guide plate 10 is manufactured using the transparent resin film and the adhesive resin layers 2, it is preferable to use binder layers 4 as shown in FIG. 5 in order to assist the adhesion between the transparent resin film and the adhesive resin layers 2, improve the bonding strength of the transparent resin film and thereby prevent separation or breakage of the transparent resin film even under the application of a strong external force. The binder layers 4 are respectively in contact with surfaces of the transparent resin film and surfaces of the adhesive resin layers 2 so that the transparent resin film can be more securely integrated into the light guide plate 10 and prevented from separation and breakage. Namely, it is preferable that the binder layer 4 is arranged between and in contact with the transparent resin film and the adhesive resin layer 2.

There is no particular limitation on the binder layer 4 as long as the binder layer 4 is capable of being bonded to or held in close contact with both of the transparent resin film and the adhesive resin layer 2. The binder layer 4 may not necessarily be a visually recognizable film or layer. For example, the binder layer 4 can be formed of an ordinary transparent adhesive material. In terms of good workability, it is preferable to perform silane coupling treatment or plasma treatment on the surface of the transparent resin film or the adhesive resin layer 2 and thereby form the binder layer 4 with, on its surface, a functional group (such as hydroxy group, carbonyl group, amino group etc.) capable of being bonded to the surfaces of the transparent resin film and the adhesive resin layer 2. The bonding strength of the transparent resin film is improved when the binder layer 4 is formed on at least one surface of the transparent resin film. It is however preferable that the binder layers 4 are respectively formed on both surfaces of the transparent resin film. When the binder layers 4 are respectively formed on both surfaces of the transparent resin film, the difference in bonding strength between the both surfaces of the transparent resin film is decreased so as to prevent local separation etc. of the transparent resin film.

The silane coupling agent used for the silane coupling treatment is not particularly limited and can be selected from those capable of being bonded to the transparent resin film and to the adhesive resin layer 2. Examples of the silane coupling agent are those containing an amino group, epoxy group, vinyl group, methacrylic group, acrylic group, isocyanate group and the like. In the case of using a PET film as the transparent resin film and using a PVB resin layer as the adhesive resin layer 2, for example, it is preferable to use an amino-containing silane coupling agent. Specific examples of the amino-containing silane coupling agent are 3-aminopropyltriethoxysilane, 3-aminopropyltrimethoxysilane and N-(2-aminoethyl)-3-aminopropyltrimethoxysilane.

(Light Guide Plate 10)

As mentioned above, the light guide plate 10 of the present invention has a haze of 0.2% or higher as determined according to JIS K 7136 and performs surface light emission. The upper limit of the haze is not particularly limited. For example, the haze of the light guide plate can be set to 10% or lower.

As shown in FIG. 2, the light guide plate 10 has a structure in which the adhesive resin layers 2 are arranged between the respective glass sheets G and the scattering layer 3. The glass sheets G and the respective layers are preferably integrated together into one. As long as surface light emission of the light guide plate is not significantly impaired, any other layer or particles may be provided between or in the respective layers for the purpose of improving the adhesion of the respective layers, improving luminance of the surface light emission or the like.

The adhesive resin layers 2 are not necessarily arranged between the glass sheets G and the scattering layer 3 when the glass sheets G and the scattering layer 3 are integrable with each other in a degassed state. For example, the surfaces of the glass sheets G and the surfaces of the scattering layer 3 can be physically adsorbed to or brought into close contact with each other. The glass sheets G and the scattering layer 3 can alternatively be integrated together by placing separate fixing members between the glass sheets G and the scattering layer 3 in a degassed state.

Preferably, the light guide plate 10 may have a total light transmittance of 70% or higher. Since the transparent resin film is used as the scattering layer 3 in the present invention, the thus-obtained light guide plate 10 shows transparency. With such transparency, the light guide plate 10 is suitably useful for various window parts, displays, interior and exterior illumination signs and the like.

(Surface Light Emitting Apparatus)

According to one preferred embodiment of the first aspect of the present invention, there is provided a surface light emitting apparatus that includes the above-mentioned light guide plate 10 and a light source 1 that allows incident light to enter the light guide plate 10 from an end surface of the light guide plate 10 as shown in FIG. 3(a). There is no particular limitation on the kind of the light source 1. The light source 1 is preferably an LED light source because the light guide plate causes scattering and propagation of even a straight ray of light from the LED light source in the present invention. In the present invention, the light guide plate 10 causes scattering of the light even when the light is incident diagonally onto the light guide plate 10 or incident onto the X-Y end surface of the light guide plate 10.

Figure 3B:
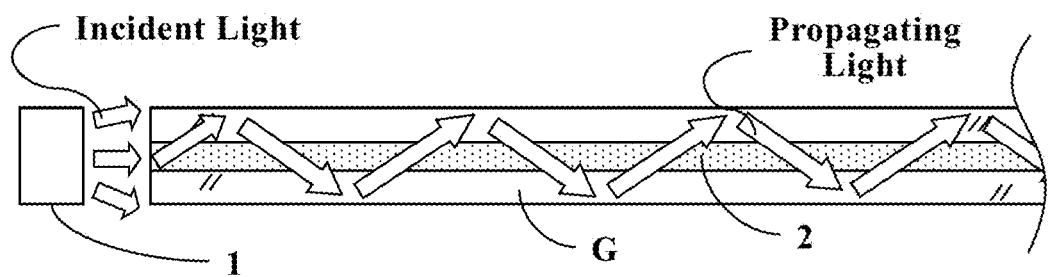
FIG. 3B is a schematic cross-sectional view showing a comparative example of light guide operation.

It is considered that the light entering the light guide plate 10 produces propagating light that propagates in the light guide plate 10 and scattered light scattered by the scattering layer 10 as shown in FIG. 3(a) whereby the light guide plate 10 performs surface light emission. It is further considered that the propagating light propagates in the Y direction by total reflection between the air and the glass sheets G In the absence of the scattering layer 3, total reflection mainly occurs as shown in FIG. 3(b) whereby surface light emission cannot be performed.

3. Manufacturing Method of Light Guide Plate

Hereinafter, the second aspect of the present invention will be described below. A manufacturing method of a light guide plate 10 according to the second aspect of the present invention includes: laminating a first glass sheet (as one glass sheet G), a stretched transparent resin film as a scattering layer 3) and a second glass sheet has another glass sheet G) in order of mention, thereby obtaining a laminate; degassing the laminate; and, after the degassing, integrating the laminate as one piece.

It is a preferred embodiment of the second aspect of the present invention that the laminate is obtained by stacking, on the first glass sheet, a first adhesive resin film (as an adhesive resin layer 2), the stretched transparent resin film, a second adhesive resin film (as an adhesive resin layer 2) and the second glass sheet in this order. In the case of using the adhesive resin films as mentioned above, it is further preferable to integrate the laminate by heating the degassed laminate under a pressurized condition. The preferred embodiment of the present invention will be now explained in more detail below. It should however be understood that the present invention is not limited to the following preferred embodiment.

First, the first adhesive resin film, the stretched transparent resin film, the second adhesive resin film and the second glass sheet are laminated in this order on the first glass sheet. At this time, it is feasible to sequentially place the respective films or feasible to integrate the respective films into a laminated film and then place the laminated film.

Next, the thus-obtained laminate is degassed to remove air between the respective films and sheets. This degassing step is performed by any known method. For example, it is feasible to degas the laminate by attaching a tube of rubber-based resin to a peripheral portion of the laminate and discharging air from the laminate through a discharge nozzle, by placing the laminate in a vacuum bag and discharging air from the vacuum bag through a discharge nozzle, by pressing the laminate between a pair of rolls, or the like.

The degassed laminate is then heated under a pressurized condition so that the respective films and sheets are integrated together into the light guide plate. For ease of operation, it is preferable to perform this integration step with the use of an autoclave. When the integration step is performed with the use of the autoclave, the pressure and temperature of the autoclave are set as appropriate depending on the kinds of the adhesive resin films and the transparent resin film. In the case of using the adhesive resin films of PVB resin or EVA resin and the transparent resin film of PET resin, for example, the laminate is integrated as one piece by heating the laminate up to the maximum temperature of 80 to 150° C. and maintaining the laminate at around such a heating temperature for 20 to 40° C. in the autoclave. At this time, the laminate is pressurized within the pressure range of 0.9 to 1.5 MPa. The heating and the pressurization can be done in any order or can be done simultaneously. The pressurization can be done from the middle of the heating. A press machine with a heating function may be used in place of the autoclave.

In the case where the adhesive resin films are not used, the surfaces of the glass sheets G and the surfaces of the scattering layer 3 may be physically adsorbed to each other or brought into close contact with each other with the use of various press machine. Alternatively, the glass sheets G and the scattering layer 3 can be integrated together by placing separate fixing members between the glass sheets G and the scattering layer 3 in a degassed state.

It is preferable to form the binder layer 4 on the surface of the transparent resin film before the lamination of the transparent resin film. In this case, the transparent resin film is laminated between the first and second adhesive resin films, with the binder layer 4 being formed on the surface of the transparent resin film.

In the case of using the adhesive resin film of PVB resin, the binder layer 4 can preferably be formed by applying an amino-containing silane coupling agent to the surface of the transparent resin film. The silane coupling agent is applicable by a known coating method such as gravure coating, roll coating, die coating, bar coating, dipping, spray coating, spin coating or the like. A gravure coating method, which can use a roll-to-roll process capable of forming a thin coating layer at a high speed, is particularly preferable.

The amino-containing silane coupling agent is preferably used e.g. in the case of using a PET film as the transparent resin film and using a PVB resin film as the adhesive resin layer 2. Examples of such a silane coupling agent are 3-aminopropyltriethoxysilane, 3-aminopropyltrimethoxysilane and N-(2-aminoethyl)-3-aminopropyltrimethoxysilane. The silane coupling agent is applied to the surface of the PET film by the above-mentioned coating method and then dried. The thus-formed silane coupling agent layer is held for a predetermined time (e.g. in a range of room temperature to 60° C. for 3 to 10 days) so as to cause reaction of the silane coupling agent with the surface of the PET film. There is thus obtained the binder layer 4. There is no particular limitation on the thickness of the binder layer 4 obtained by the above method. The thickness of the binder layer 4 can be of the order of 0.5 μm to 10 μm.

Alternatively, the binder layer can be formed by performing plasma treatment on the surface of the transparent resin film. By the plasma treatment, high-energy electrons or ions impinge on the transparent resin film to generate a new highly reactive functional group such as carboxyl group, hydroxy group, amino group, carbonyl group or the like at or around surface of the transparent resin film. The functional group varies depending on the kind of the atmospheric gas used for the plasma treatment. The atmospheric gas is selected as appropriate depending on the kinds of the transparent resin film and the adhesive resin layer 2. Examples of the atmospheric gas are argon, helium, nitrogen, oxygen, air, carbon dioxide, water vapor and the like. The plasma treatment may be performed in a vacuum or in the air. In the case of using e.g. a PET film as the transparent resin film and using a PVB resin film as the adhesive resin layer 2, it is feasible to form the binder layer 4 on the surface of the PET film by performing plasma treatment on the PET film of A4 size for about 30 seconds to 3 minutes in the air with the use of a plasma surface treatment device.

EXAMPLES

The present invention will be described in more detail below by way of the following examples and comparative examples. It should however be understood that the present invention is not limited to the following examples.

Glass sheets used were of soda-lime float glass (about 300 mm×210 mm in size and 2 mm in thickness). As adhesive resin layers, PVB resin films (0.38 mm in thickness) were used. The following biaxially stretched PET films A to E were used as transparent resin films. The respective transparent resin films were tested for the haze before the production of light guide plates as test samples.

A: Super transparent polyester film (manufactured as "COSMOSHINE A4300" by Toyobo Co., Ltd., thickness: 50 μm)
B: Super transparent polyester film (manufactured as "COSMOSHINE A4300" by Toyobo Co., Ltd., thickness: 125 μm)
C: Polyester film (manufactured as "Lumirror T60" by Toray Industries, Inc., thickness: 50 μm)
D: Polyester film (manufactured as "Lumirror T60" by Toray Industries, Inc., thickness: 188 μm)
E: Polyester film (manufactured as "Lumirror U34" by Toray Industries, Inc., thickness: 50 μm)

Examples 1 to 4 and Comparative Example 1

Each of the samples was produced as follows. The PVB resin film, the biaxially stretched PET film, the PVB resin film and the glass sheet were laminated in this order on the glass sheet, thereby obtaining a laminate. The laminate was degassed by placing the laminate in a vacuum bag and discharging air from the vacuum bag through a discharge nozzle. Then, the laminate was placed in an autoclave and subjected to heating and pressurization treatment. In the heating and pressurization treatment, the treatment temperature was 135° C.; the treatment pressure was 1 MPa; and the treatment time was 30 minutes. The haze, total light transmittance and luminance of the thus-produced samples were measured by the below-mentioned methods.

Comparative Example 2

The sample was produced in the same manner as in Example 1, except that no transparent resin film was used. The haze, total light transmittance and luminance of the thus-produced sample were measured in the same manner as in Example 1.

(Measurement of Haze and Total Light Transmittance)

The haze values of the respective transparent resin films and the haze values and total light transmittance values of the respective samples were measured according to JIS K 7136 with the use of a haze meter (manufactured as "HX-T" by Suga Test Instruments Co., Ltd.). The measured values are shown in TABLE 1. Herein, the haze values of the transparent resin films and the haze values of the samples are indicated in the columns "Film" and "Light Guide Plate", respectively.

(Measurement of Luminance)

Each of the samples was placed on a light emitting portion of a tape-type LED (available as "5050 Tape LED 8142" from LED Paradise Com.). At this time, an end surface (X-Z surface) of the sample was brought into contact with the tape-type LED. The sample was irradiated with light (white light) from the LED such that the light entered the sample from the end surface of the sample.

Figure 4A:
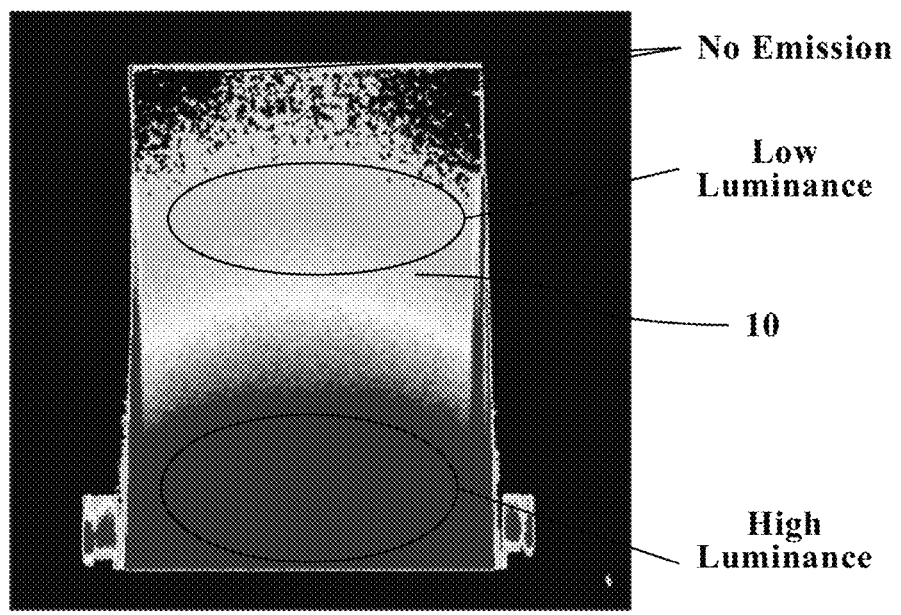
FIGS. 4A and 4B are diagrams respectively showing luminance distributions during surface light emissions in Example 3 and Comparative Example 2.

Then, the luminance (cd/m$^2$) of surface light emission from an X-Y surface of the sample was measured with the use of a two-dimensional luminance colorimeter (manufactured as "UA-200A" by Topcon Technohouse Corporation). The luminance measurement was carried out in a darkroom. The spacing between the sample and the two-dimensional luminance colorimeter was set to 800 mm. The measurement point of the sample was at a position of 20 mm from the lower side of the light guide plate in the vicinity of the width center of the light guide plate. The measured values are shown in TABLE 1.

measured with the two-dimensional luminance colorimeter (manufactured as "UA-200A" by Topcon Technohouse Corporation) during surface light emission is shown in FIG. 4(a). As is apparent from this figure, surface light emission was actually confirmed in Example 3.

Figure 4B:
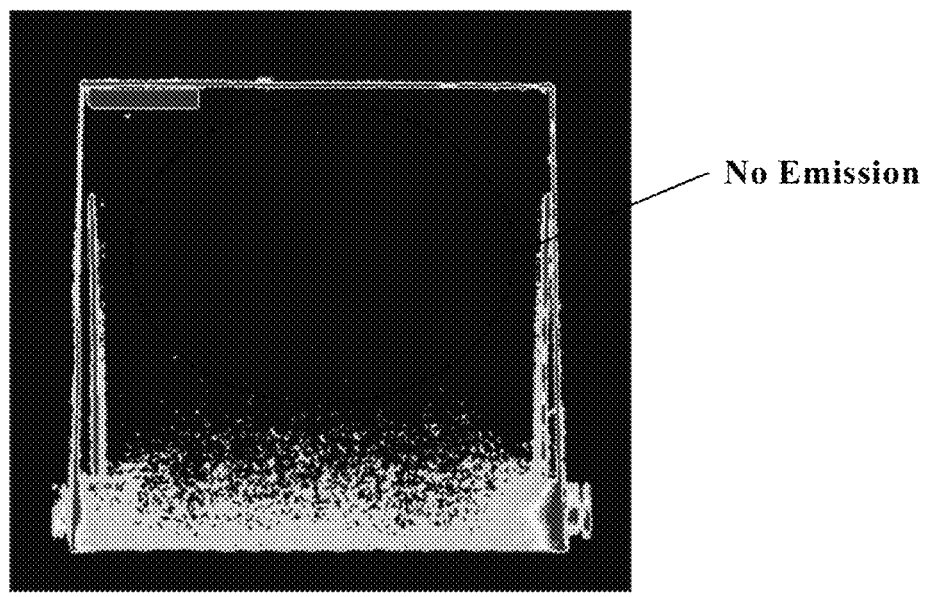

On the other hand, the light guide plate of Comparative Example 1 had a haze of 0.1% and a luminance value equivalent to that of Comparative Example 2. The luminance distribution of the light guide plate of Comparative Example 2 was measured in the same manner as that of Example 3 by the entry of light into the end surface of the light guide plate. The measurement result is shown in FIG. 4(b). As is apparent from the measurement result, surface light emission was not observed in Comparative Example 2.

In each of Examples 1 to 4 and Comparative Example 1, the haze of the light guide plate was lower than the haze of the film itself before integrated into the light guide plate. The reason for this is assumed to be that the surface haze of the film was lowered by integrating the film into the light guide plate as explained above.

DESCRIPTION OF REFERENCE NUMERALS

G: Glass sheet
1: Light source
2: Adhesive resin layer
3: Scattering layer
4: Binder layer
10: Light guide plate
11: Lower side
12: Upper side

The invention claimed is:

1. A light guide plate comprising:
two glass sheets;
a scattering layer sandwiched between and integrated with the glass sheets; and
adhesive resin layer arranged between the scattering layer and the respective glass sheets,
wherein the scattering layer is a stretched transparent resin film, and
wherein the light guide plate has a haze of 0.2% or higher as determined according to JIS K 7136 established on Feb. 20, 2000 by Japanese Industrial Standards Committee.

TABLE 1

|  | Transparent resin film | | Haze (%) | | Total light | |
| --- | --- | --- | --- | --- | --- | --- |
|  | Kind | Thickness (μm) | Film | Light guide plate | transmittance (%) | Luminance (cd/m$^2$) |
| Example 1 | B | 125 | 1.2 | 0.3 | 90.1 | 16.7 |
| Example 2 | C | 50 | 1.0 | 0.7 | 89.8 | 14.8 |
| Example 3 | D | 188 | 3.0 | 2.5 | 88.9 | 48.6 |
| Example 4 | E | 50 | 0.4 | 0.2 | 90.2 | 13.0 |
| Comparative Example 1 | A | 50 | 0.7 | 0.1 | 89.7 | 7.1 |
| Comparative Example 2 | — | — | — | 0.1 | 90.1 | 7.2 |

It is apparent from the above table that the light guide plates of Examples 1 to 4 had a haze of 0.2% or higher and had a higher luminance than that of Comparative Example 2 where no transparent resin film was used. Further, the luminance distribution of the light guide plate of Example 3

2. The light guide plate according to claim 1, wherein the transparent resin film is a biaxially stretched transparent polyethylene terephthalate film.

3. The light guide plate according to claim 1, wherein the adhesive resin layer contains at least one selected from the group consisting of a polyvinyl butyral resin, an EVA resin, a cycloolefin polymer resin, a polyurethane resin and an acrylic resin.

4. The light guide plate according to claim 1, further comprising a binder layer between the transparent resin film and the adhesive resin layer, wherein the binder layer is in contact with the transparent resin film and the adhesive resin layer.

5. The light guide plate according to claim 1, wherein the light guide plate has a total light transmittance of 70% or higher.

6. A surface light emitting apparatus comprising:
the light guide plate according to claim 1; and
a light source that allows incident light to enter the light guide plate from an end surface of the light guide plate.

7. The surface light emitting apparatus according to claim 6, wherein the light source is an LED light source.

8. A manufacturing method of a light guide plate, comprising:
laminating a first glass sheet, a first adhesive layer, a stretched transparent resin film as a scattering layer, a second adhesive layer and a second glass sheet in order of mention, thereby obtaining a laminate;
degassing the laminate; and
after the degassing, integrating the laminate as one piece
wherein the light guide plate has a haze of 0.2% or higher as determined according to JIS K 7136 established on Feb. 20, 2000 by Japanese Industrial Standards Committee.

9. The manufacturing method of the light guide plate according to claim 8, wherein the integrating includes, after the degassing, heating the laminate under a pressurized condition.

10. The manufacturing method of the light guide plate according to claim 8, further comprising, before the laminating of the transparent resin film, forming a binder layer on a surface of the transparent resin film.

11. The manufacturing method of the light guide plate according to claim 8, wherein the transparent resin film is a biaxially stretched transparent polyethylene terephthalate film.

12. The manufacturing method of the light guide plate according to claim 8, wherein the integrating includes heating the laminate in a range of 80 to 150° C.

* * * * *